United States Patent [19]

Lemelson

[11] 4,053,274
[45] Oct. 11, 1977

[54] TUBE WALL FORMING APPARATUS

[76] Inventor: Jerome H. Lemelson, 85 Rector St., Metuchen, N.J. 08840

[21] Appl. No.: 544,834

[22] Filed: Jan. 28, 1975

[51] Int. Cl.² .............................................. B29D 23/04
[52] U.S. Cl. .................................. 425/381; 264/209; 264/310; 425/467
[58] Field of Search .................... 425/112, 113, 131.1, 425/380, 381, 392, 393, 394, 327, 466, 396, 467, 376; 18/12 RR, 14 RR; 264/209, 286, 310, DIG. 52; 72/264

[56] References Cited

U.S. PATENT DOCUMENTS

| | | | |
|---|---|---|---|
| 2,801,441 | 8/1957 | Wadsworth | 425/168 |
| 3,193,604 | 7/1965 | Mercer | 425/381 |
| 3,283,050 | 11/1966 | Boggs | 425/123 X |
| 3,327,039 | 6/1967 | Ruckert et al. | 425/393 |
| 3,346,921 | 10/1967 | Bunish et al. | 425/113 |
| 3,387,069 | 6/1968 | Stohr | 425/381 |
| 3,520,023 | 7/1970 | Verges et al. | 425/113 |
| 3,557,403 | 1/1971 | Lemelson | 425/113 |
| 3,660,000 | 5/1972 | Yoshida et al. | 425/380 |
| 3,692,889 | 9/1972 | Hetrich | 425/327 X |
| 3,891,007 | 6/1975 | Kleykamp | 425/396 X |

FOREIGN PATENT DOCUMENTS

| | | | |
|---|---|---|---|
| 2,131,362 | 12/1971 | Germany | 425/392 |
| 526,419 | 5/1955 | Italy | 425/112 |

Primary Examiner—Francis S. Husar
Assistant Examiner—Mark Rosenbaum

[57] ABSTRACT

An apparatus and method are provided for forming tubing of plastic which is forced through a die over a mandrel wherein the inside surface of the tubing is relatively smooth in configuration and the exterior surface thereof is formed with one or more helical ribs or teeth protruding outwardly therefrom which serve to enhance the rigidity of the tube wall and, when the plastic itself is relatively rigid, to render the tube wall more flexible so that it may be deformed or bent without collapsing. In one form, the extrusion die through which the extrusion material is forced to form the tube, is configured to provide the helical formations in the outer stratum of the tube wall and is power rotated as the extrudate is forced through the die to form the helical formation therein. In another form, a portion of the extrusion die is power rotated to form the helical formation. In a third form, control of the rotation of the die or a device located at the throat or exit of the die is affected to perform either or both of the functions of variably changing the shape of the helical formation and, providing portions of the tubing which are free of the helical formation to permit fittings to be attached thereto.

7 Claims, 6 Drawing Figures

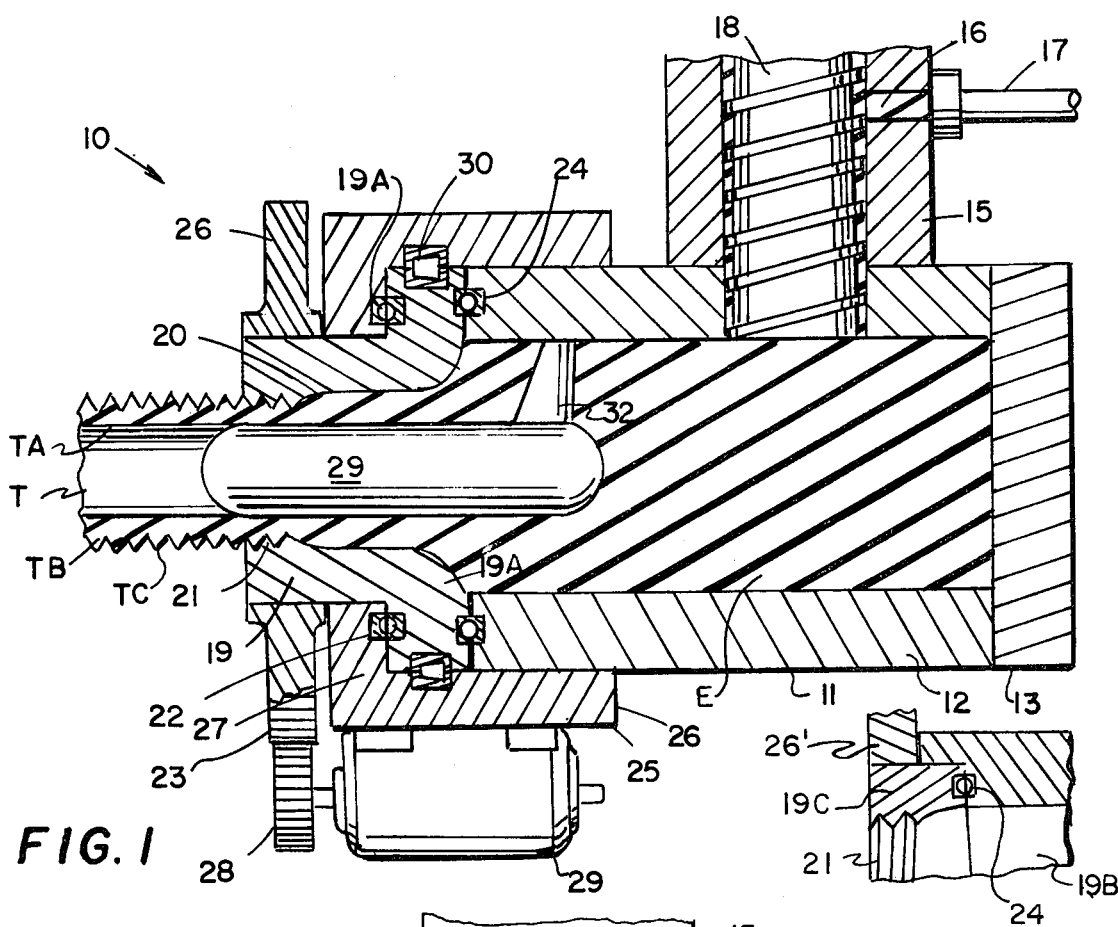
FIG. 1
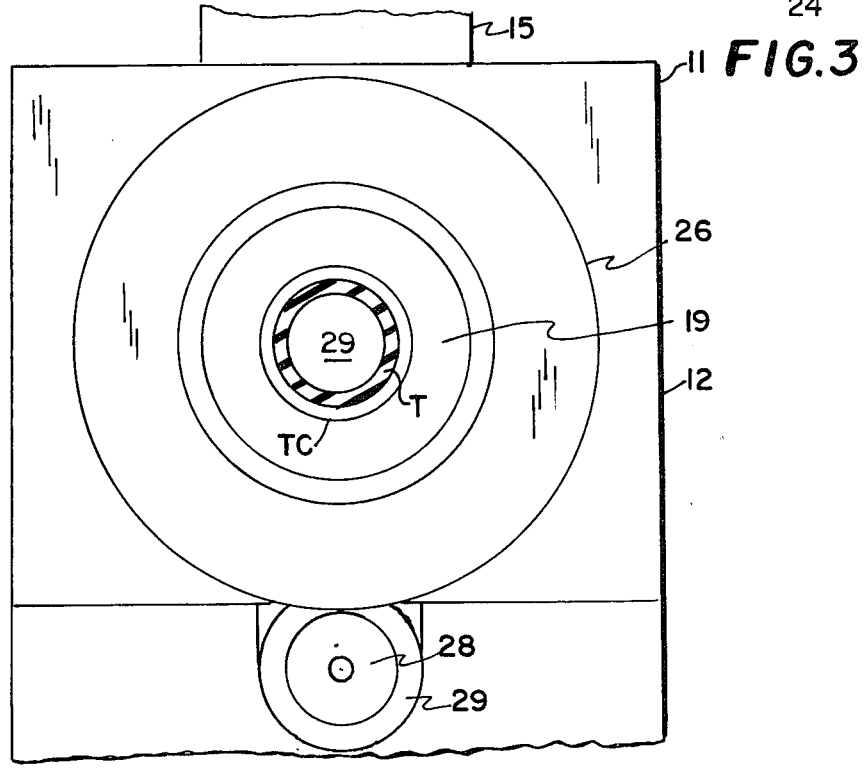
FIG. 2
FIG. 3

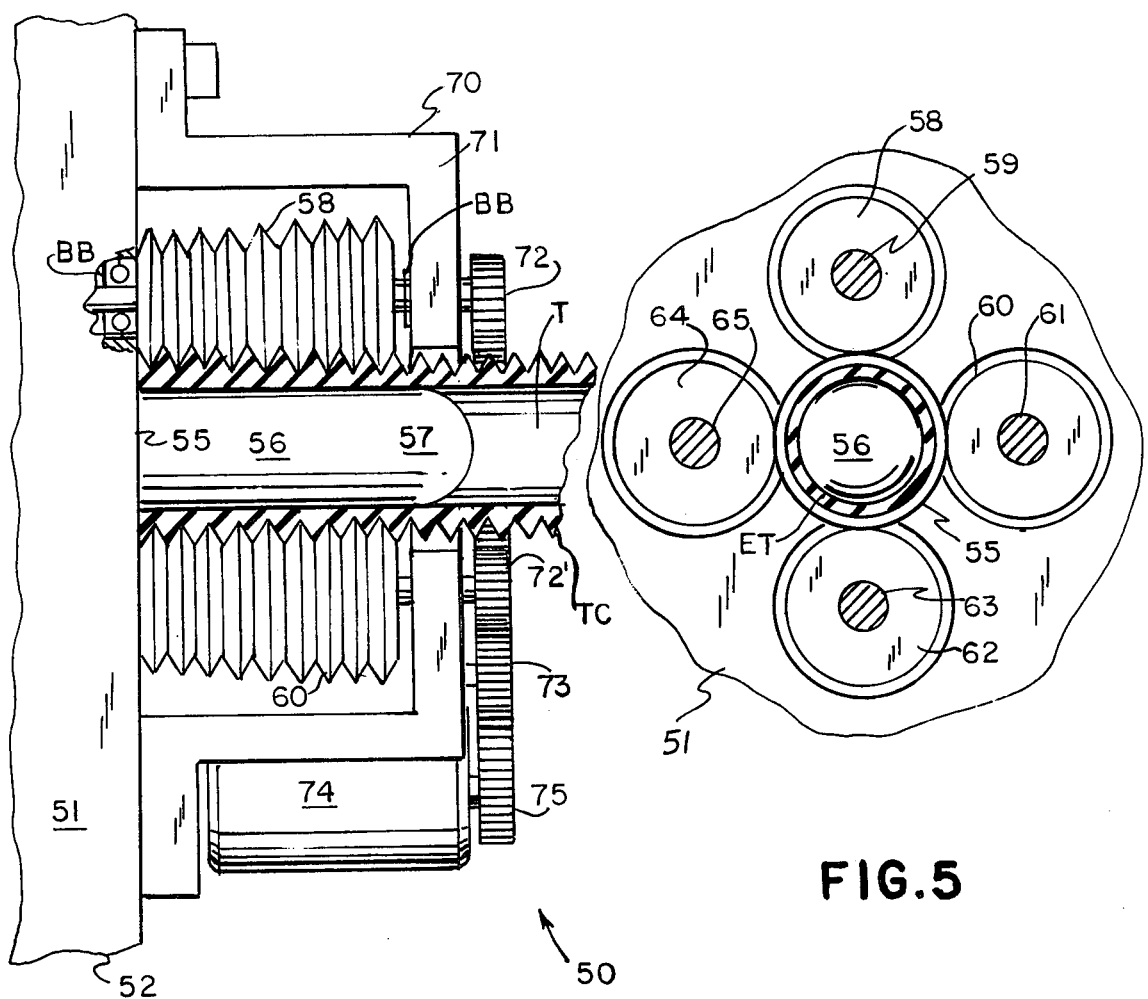
FIG.5
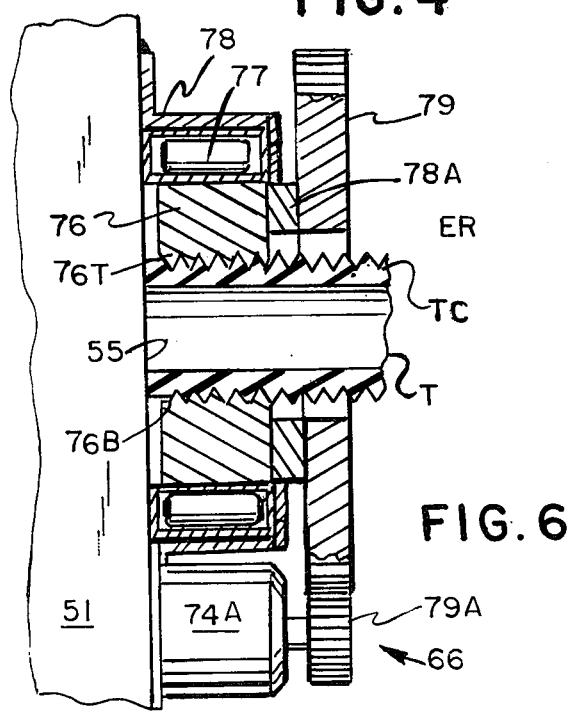
FIG.4
FIG.6

TUBE WALL FORMING APPARATUS

SUMMARY OF THE INVENTION

This invention relates to an apparatus for forming tubing out of rigid or flexible plastic resin and, in certain instances, of metal such as aluminum, which tubing has an inside surface which is relatively smooth and void of irregularities and an outside surface containing a helical thread-like or rib-like formation extending along either its entire length or selected portions thereof. In particular, the invention defines an apparatus in the form of an extruder having an extrusion die with a mandrel extending through the die to form the smooth inside surface of the tubing and either the entire die or a portion thereof adapted to be power rotated about the tubing so as to form the exterior surface or outer stratum of the tubing with a helical rib-like formation which serves to substantially stiffen the wall thereof, in the case of a flexible polymer and, when a rigid polymer or metal is extruded, to both radially support the wall and provide the rigid material in the form of a tube which may be more easily flexed without the wall buckling or collapsing.

It is known in the prior art to form tubing of metal and plastic having a corrugated wall structure permitting the tube to be easily flexed without buckling. However, such tubing structures have both interior and exterior surfaces irregular in configuration and, as a result, when certain fluids are flowed therethrough, unwanted resistance to flow is effected by means of the irregular internal configuration. The instant invention is concerned with tubing having a smooth or regularly shaped internal surface and an irregular external surface which is shaped in such a manner as to substantially enhance the rigidity of the wall of the tubing for a particular amount of material employed therein and, furthermore, permits the tubing to be more easily flexed without collapsing.

Accordingly, a primary object of this invention is to provide an apparatus for producing new and improved structures in plastic tubing.

Another object is to provide an apparatus for producing plastic tubing of a particular inside diameter with the wall or walls thereof being shaped in such a manner as to be radially supported against buckling under forces applied thereto which would ordinarily buckle the walls of a tube of substantially the same inside diameter or capacity which are not so shaped.

Another object is to provide an apparatus for producing a tube or pipe of flexible material having a smooth internal surface and an irregular external shape which includes a plurality of rib-like formations which substantially rigidize the tube wall to prevent it from buckling during use.

Another object is to provide an apparatus for rendering a rigid plastic tube substantially more flexible by shaping the outer stratum thereof during the formation of the tube.

Another object is to provide an apparatus for forming a tube with a spiral corrugation formed in one side of the tube wall without varying the shape of the inside surface of the tube.

Another object is to provide an apparatus for continuously forming a tube with a spiral corrugation formed in the outer stratum of the tube wall wherein portions of the tube length are void for such corrugation to permit the fastening of fittings thereto without difficulty.

Another object is to provide an apparatus for extrusion forming a cylindrical tube having its outer stratum formed with a spiral rib or corrugation therein and its inner surface relatively smooth and free of such deformation.

With the above and such other objects in view as may hereinafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 1 is a side view with parts broken away and sectioned for clarity of an extrusion apparatus containing an extrusion die which is power rotated around the extrusion formed therein, and FIG. 2 is an end view of the apparatus in FIG. 1.

FIG. 3 is a cross sectional view of a modified form of a portion of the apparatus of FIG. 1;

FIG. 4 is a side view with parts broken away for clarity of part of an extrusion apparatus for producing extruded tubing of the type produced by means of the apparatus of FIGS. 1-3;

FIG. 5 is an end view with parts removed for clarity of part of the apparatus of FIG. 4; and FIG. 6 is a side view with parts broken away for clarity of a modified form of the apparatus of FIGS. 4 and 5.

There is shown in FIGS. 1 and 2 an extrusion apparatus 10 for forming tubular extrusions of irregular external configuration but having an internal configuration, preferably smooth and in most cases cylindrical, which does not vary in shape along its length. The apparatus 10 is shown in the act of extruding a tubular formation denoted T, preferably of a plastic polymer although it may also be formed of a metal such as aluminum or other suitable metal which may be easily extruded and deformed.

The apparatus 10 includes an extrusion chamber 11 having a side wall 12 and an end wall 13 at one end thereof. The extruder 11 may comprise any suitable plastic or metal extrusion chamber including a piston or powered screw for forcing extrusion material through the chamber. In FIG. 1, most of the interior volume 14 which is surrounded by the side wall 12 is shown filled with an extrudate E which is forced therein by means of an extrusion screw 18 rotated by a motor (not shown) within a sub-chamber 15 to force extrusion material fed from an inlet conduit 17 through an inlet 16 in the wall of the sub-chamber 15 to the vicinity of the screw. A conventional plastic or metal extruder may also be employed in which the extrusion screw is located in the main chamber 14 and is power rotated to force extrusion material therealong and therefrom into the opening 20 in the extrusion die 19.

The extrusion die 19 is adapted to be rotated about the longitudinal axis of the tubing T formed therein. A mandrel 29 is supported by means of a number of brackets 32 which extend radially outwardly therefrom and are attached to the side wall 12 of the extrusion chamber 11. The extrusion die 19 is adapted to rotate symmetrically about the mandrel 29 which extends therethrough. The die 19 is shown retained against the front face of the extrusion chamber wall 11 by means of retaining fitting 25 having a cylindrical side wall 26 which is secured with fasteners or welded to the outer surface of the end of side wall 12 of the extrusion chamber 11. The fitting 25 also has an end wall 27 which extends radially inwardly from the side wall 26 and overhangs an outwardly extending portion 19A or shelf portion of the die 19. A ballbearing 22 is retained within aligned circular grooves between portion 27 of the retaining fitting 25 and the portion 19A of the die 19 while a roller bearing 30 is supported between the outer surface of die portion 19A and the overhanging inner surface of the side wall 26 of fitting 25. A rotary seal 24 is provided in grooves between the rear surface of the die 19 and the front end of the side wall 12 of the extrusion chamber to prevent extrusion material from leaking between the rotary die 19 and the extrusion chamber.

The die 19 has the front end of its throat 20 in which extrudate is formed to shape, shaped with one or more formations 21 which are preferably tapered helical, thread forming formations machined in the inside surface of the die throat. As the die 19 rotates, the formations 21 receive material from the chamber 14 and serve to form a spirally extending rib or threadlike formation in the outer stratum of the tubing T. The inside surface TA of tubing T is relatively smooth or configured in accordance with the shape of the end of the mandrel 19 over which the extrusion material flows. The outer surface TB of the tubing T is shaped with a spirally extending thread-like formation TC as extrusion occurs and die 19 rotates.

Die 19 is power rotated by means of an electric motor 29 shown supported by the extruder beneath the chamber wall 12. The motor 29 preferably operates at high constant speed and may comprise a gear motor itself having a spur gear 28 connected to its output shaft. Gear 28 meshes with the teeth of a large gear 26 which is welded or fastened to the forward end of the rotatable extrusion die 19. Thus a motor 27 operates, the die 19 will be rotated thereby in a given direction and the thread-like formations 21 in the forward end wall portion of the die will serve to form a spirally extending thread TC in the outer surface and stratum of the extrusion T.

The mandrel 29 is shown supported by a plurality of legs, one of which is denoted 32 and is shown in being fastened to the extrusion chamber wall 12. Other such legs may be provided in the form of a so-called spider mount for holding the mandrel stationary against the extrusion chamber while the die 19 rotates. However, the mandrel 29 may also be supported by means of a spider mount by the extrusion die 19 itself so that the mandrel rotates with said die. However, if the mandrel 29 is held stationary, it may serve to prevent twisting of the extrusion T during extrusion, a condition which may be caused by forces applied to the extruding tubing by the rotating die. If the mandrel is held stationary and contains one or more irregular formations therein or is not exactly cylindrical in shape, it may be employed to prevent the extrusion T from rotating as the extrusion die 19 rotates.

If the motor 29 is predeterminately controlled to stop for predetermined periods of time during extrusion, and the die 19 is properly cooled by circulating a heat transfer fluid there-through as it rotates, then the portion of the extrusion being formed while the die 19 is stationary will have its outer surface relatively smooth, a condition which may be effected for selected lengths of the extrusion so that when the extrusion is cut along such selected lengths, the end portions of the cut lengths will be void of the spirally extending thread-like formation TC so that one or more fittings may be secured thereto without difficulty and without leakage of fluid material flowed through the tube T, when in use.

To facilitate the formation of the spirally extending thread in the tubing T, motor 29 may be predeterminately controlled to intermittently drive the die 19 in rotation so as to facilitate the extrusion of the tubular member T.

The extrusion screw 18 is shown as rotatably supported within a sub-chamber defined by a housing 15 extending outwardly from the main extrusion chamber 11, as shown in FIG. 1. As the screw 18 rotates, extrusion material is fed from an inlet conduit 17 through an inlet 16 in the side chamber 15 and is forced by means of the screw 18 into the main chamber 14 from which it is extruded as the tube T.

In another form of the invention, it is noted that the mandrel 29 may be longitudinally oscillated in the opening 20 in the extrusion die 19, either continuously during extrusion to facilitate the extrusion operation or at predetermined points in extrusion cycle so as to predeterminately vary the shape of the wall of the extrusion.

It is noted that the extrusion mandrel 29 may be shaped other than cylindrical as illustrated to provide an internal surface of the extrusion containing one or more irregular longitudinal formations therein which do not vary along the length of the tubing but further serve to improve the rigidity of the tube wall. Also, by suitably shaping the surface of the wall of the throat of the extrusion die with one or more longitudinally extending grooves or channels therein, with or without the illustrated spiral groove and rib formation 21, a variety of different surface configurations may be provided along the length of the extrusion formed therein. Such surface configurations may include, in addition to a spirally extending rib or ribs, longitudinally extending ribs which are formed by a portion of the die which does not rotate.

Plastic polymers which may be extruded in the apparatus of FIGS. 1 and 2 includes such flexible plastics as medium and low density polyethylene, plasticized polyvinylchloride, polypropylene, polybutylene, and others. Rigid plastics which may be extruded in the apparatus illustrated include rigid polyvinylchloride, cellulose acetate butyrate, high impact polystyrene, polyamides, and other resins.

FIG. 3 shows a modified form of extrusion die which is applicable to the apparatus of FIGS. 1 and 2 wherein only a portion of the extrusion die rotates to form the thread-like formation in the outer stratum of the wall of the tubular extrusion. The die is composed of a stationary die element 19B which rotatably supports a ring shaped die element 19C having its inside surface along which extrusion material flows and is formed to shape (e.g. the throat of the die) shaped with one or more thread formations or teeth 21 therein for shaping the extrusion flowed therethrough with the helically extending thread formation TC shown in FIG. 1. A ring shaped spur gear 26' is welded to the outside peripheral surface of ring shaped die element 19C and meshes with the gear of motor 29 or a gear train driven by such a motor to power rotate the ring shaped die element 19C. The gear meshing with gear 26' or an overhanging portion of the main die element 19B may be employed to retain die element 19C against the front face of die element 19B while a rotary seal 24 disposed in grooves between the slidably contacting surfaces of 19B and 19C serves to prevent flow of extrudate therebetween.

In FIGS. 4 and 5 is shown a modified form of apparatus 50 for forming irregular formations in the exterior surface of a freshly extruded plastic or metal tubular extrusion denoted ET. The tubular extrusion is formed by means of an extruder 51, the end wall portion 52 of which is illustrated as supporting or disposed adjacent to the extrusion die 54. An extrusion mandrel 56 extends through the opening 55 in die 54 and has an end portion 57 protruding beyond the die exterior of the extruder. The extruded tube is forced over the mandrel and out of the extrusion die and is exteriorally engaged by a plurality of forming tools, four of which 58, 60, 62 and 64 are shown in FIG. 5 as being equally disposed around the mandrel and rotatably supported on shafts 59, 61, 63 and 65 which are respectively rotationally supported within bearings BB supported by the front wall 52 of the extruder and respective portions 71 of a frame 70 supported also by the extruder wall.

Each of the forming dies 58–64 has an irregular outer surface of revolution containing a helical thread formation 66 therein which is so configured that as the dies rotate against the extrusion ET, they form the outer stratum of the extrusion against the surface of the end of the mandrel 56 which protrudes beyond the extruder, with a spiral rib formation ER while the inside surface of the extruded tube remains substantially as defined by the shape of the mandrel 56. The inside surface of the extruded tube ET may be relatively smooth and void of irregularities or may be otherwise configured in accordance with the shape of the end portion 57 of the mandrel 56.

The shafts 59, 61, 63 and 65 on which the dies 58–64 are mounted, extend beyond the legs 71 of the frame 70 and each has a spur-gear 72 secured thereto which gear meshes with gears forming part of a gear train 73 which is driven by a gear 75 connected to the shaft of a constant speed motor 74 which is supported by frame 70. If the motor 74 is operated at a suitable constant speed and drives the dies 58–64 at suitable speed, then a tube will be produced having a smooth inside surface and an outer surface defined by a helically extending rib or tapered fin ER or a group of such formations extending along the entire length of the extruded tube.

It is noted that the spiral rib formation TC of FIG. 4 as well as the similar rib formation F of FIGS. 1—3 may be configured other than as illustrated in the drawings. While the formations of FIGS. 1-4 are shown as having tapered shapes which terminate at rather narrow or shape edging, they may also be semi-circular in cross sectional shape or may have relatively flat outer surface configurations with substantially parallel or somewhat less sloping side walls than shown. The rib-like formation F of FIGS. 1-3 and the spiral ribbing of FIGS. 4 and 5 are shown in the drawings as forming at least half of the wall thickness of the extrusions. They may also form somewhat greater or lesser portions of the extrusion wall than shown in the drawings. It is also noted that the spiral rib-like formations TC of FIGS. 1-3 may also be spaced separated from each other degrees greater than shown in the drawings.

In FIG. 6 a third form of apparatus 66 is provided for forming the outer stratum of a tubular extrusion wall with a spirally extending rib or thread-like formation TC similar to the formations provided in the extruded tube walls of the extrusions formed in the apparatus of FIGS. 1-3 and FIGS. 4 and 5. A disc shaped die 76 is shown rotatably supported by the inner race of a roller bearing 77 which is secured in alignment with the opening 55 of an extrusion die terminating an extruder 51, the end wall portion of which is shown in the drawing. The central opening 76B in the tube wall forming die 76 is shaped with a spirally extending tube wall forming thread 76T. The die 76 is supported for rotation in concentric alignment with the extrusion die opening so that it engages and penetrates the outer stratum of the wall thereof. A ring 78A is welded to the front face of die 76 and supports an annular disc shaped gear 79 which is power rotated about the extrusion T by a gear motor 74A the output shaft gear 79A of which engages the teeth of gear 79. A circular bracket 78 secures and retains the outer race of the roller bearing against the front face of the extrusion chamber or die. Thus as forming die 76 is power rotated by the driving of gear 79, its internal forming threads 76T will form the outer stratum of the wall of the tubular extrusion T with a helical thread-like formation or rib TC stiffening the tubular wall without the need to vary or shape the inside surface of the tube. Although not shown, the rear face of the shaping die 76 may slidably engage the front face of the extrusion die and be provided with a sliding seal therewith to support same and to prevent the lateral flow of extrudate.

While in FIG. 6 the extrusion die mandrel illustrated in FIGS. 4 and 5 is not shown as extending outwardly from the front face of the extrusion die, it may or may not be so provided depending on the nature of the extrudate, it condition when it leaves the extrusion die and the wall thickness of the tubular extrusion. In other words, the die 76 may operate against the wall of the tubular extrusion ET with or without internal support supplied by a projecting portion of the extrusion mandrel.

While the configuration and height or diameter of the rib-like spiral formation may vary depending on tubing parameters, for most stiffening configurations the spirally extending formation will preferably vary from between one half and three quarters the wall thickness of the finished tubing.

I claim:
1. An apparatus for continuously extruding tubing having a smooth interior wall surface which has a substantially constant internal diameter and having an exterior wall which varies in configuration along the length thereof wherein said configuration is in the form of corrugations having a depth equal to at least one-half of the wall thickness of the extruded tube to provide a flexible tube having a resistance free flow path comprising:

an extruder including an extrusion die having a die opening,
 a mandrel supported within said die and extending beyond said die opening to define with said die opening an annular passageway,
 means connected to said die to define a chamber adapted to be filled with an extrudate,
 means associated with said chamber for forcing the extrudate about said mandrel and through said annular passageway,
 said mandrel having a smooth outer surface to form the tubular extrusion having a smooth regularly shaped internal surface having a substantially constant diameter,
 corrugating means operatively associated with said die and having a corrugating formation for engaging the exterior surface of the tubular extrusion formed in said die, said corrugating formation having a depth equal to at least one-half the thickness of tubular extrusion formed in said die, drive means connected to said corrugating means for effecting the rotation thereof as said tubular extrusion is being formed in said die to form a series of spiral protrusions in the outer stratum of the tubular extrusion only, wherein said corrugating means comprises a component part of said die defining said die opening.

2. The invention as defined in claim 1 and including means operatively associated with said drive means for intermittently operating said drive means so as to effect intermittent operation of said corrugating means to provide a tubular extrusion having a helical rib-like formation extending along preselected portions of the outer stratum thereof and having other portions of said outer stratum void of said rib-like formations.

3. An apparatus in accordance with claim 1 wherein said corrugating means includes a forming tool disposed about said die opening and located to engage the outer stratum of the tubular extrusion expressed through said die opening wherein said forming tool includes a cylindrical die rotatably supported around and concentric with said extrusion die, said cylindrical die having a corrugated internal surface, and said drive means operatively associated with said die for rotating said cylindrical die around said tubular extrusion to cause the corrugated internal surface thereof to engage and form the outer stratum of said tubular extrusion with helically extending ribs.

4. An apparatus as defined in claim 1 wherein said corrugating means includes a forming tool disposed about said die opening and located to engage the outer stratum of the tubular extrusion expressed through said die opening, wherein said forming tool comprises a forming die with a circular corrugated opening therein, means operatively associated with said extrusion die for rotatably supporting said forming die exteriorly of said extrusion die in a position to receive the tubular extrusion, and said drive means rotating said forming die to form on the outer surface of said tubular extrusion a series of helical rib formations as said extrusion tube is expressed through said die opening.

5. An apparatus in accordance with claim 1, said mandrel being shaped to normally prevent rotation of the extrusion form thereon.

6. An apparatus for continuously extruding tubing having a smooth interior wall surface which has a substantially constant internal diameter and having an exterior wall which varies in configuration along the length thereof wherein said configuration is in the form of corrugations having a depth equal to at least one-half of the wall thickness of the extruded tube to provide a flexible tube having a resistance free flow path comprising:

an extruder including an extrusion die having a die opening, a mandrel supported within said die and extending beyond said die opening to define with said die opening an annular passageway, means connected to said die to define a chamber adapted to be filled with an extrudate, means associated with said chamber for forcing the extrudate about said mandrel and through said annular passageway, said mandrel having a smooth outer surface to form the tubular extrusion having a smooth regularly shaped internal surface having a substantially constant diameter, corrugating means operatively associated with said die and having a corrugating formation for engaging the exterior surface of the tubular extrusion formed in said die, said corrugating formation having a depth equal to at least one-half the thickness of tubular extrusion formed in said die, drive means connected to said corrugating means for effecting the rotation thereof as said tubular extrusion is being formed in said die to form a series of spiral protrusions in the outer stratum of the tubular extrusion only, wherein said corrugating means includes a plurality of forming tools disposed about said die opening and located to engage the outer stratum of the tubular extrusion expressed through said die opening.

7. The invention as defined in claim 6 wherein said forming tool includes a plurality of cylindrical members disposed about said die opening, each of said cylindrical members having external corrugation formations on the outer surface thereof, said surface being disposed in engagement with the outer stratum of the tubular extrusion to form complementary corrugations in the outer stratum of the tubular extrusion.

* * * * *